Dec. 4, 1951          C. E. KERR          2,577,530
GREEN CORN CUTTER
Filed Sept. 30, 1946                5 Sheets-Sheet 1

INVENTOR
CHARLES E. KERR
BY Philip G. Minnis
Hans G. Hoffmeister
ATTORNEYS

Dec. 4, 1951 C. E. KERR 2,577,530
GREEN CORN CUTTER
Filed Sept. 30, 1946 5 Sheets-Sheet 2

INVENTOR
CHARLES E. KERR
BY
ATTORNEYS

Dec. 4, 1951　　　　　C. E. KERR　　　　　2,577,530
GREEN CORN CUTTER
Filed Sept. 30, 1946　　　　　　　　　　　5 Sheets-Sheet 3

FIG. 4

INVENTOR
CHARLES E. KERR

BY Philip A. Minnis
Hans G. Hoffmeister
ATTORNEYS

Dec. 4, 1951  C. E. KERR  2,577,530
GREEN CORN CUTTER
Filed Sept. 30, 1946  5 Sheets-Sheet 4

INVENTOR
CHARLES E. KERR
BY
ATTORNEYS

Dec. 4, 1951   C. E. KERR   2,577,530
GREEN CORN CUTTER

Filed Sept. 30, 1946   5 Sheets-Sheet 5

INVENTOR
CHARLES E. KERR
BY
ATTORNEYS

Patented Dec. 4, 1951

2,577,530

UNITED STATES PATENT OFFICE 2,577,530

GREEN CORN CUTTER

Charles E. Kerr, Hoopeston, Ill., assignor to Food Machinery and Chemical Corporation, a corporation of Delaware Application September 30, 1946, Serial No. 700,245

4 Claims. (Cl. 130—9)

This invention appertains to corn cutters and relates more particularly to an improved mechanism for automatically cutting the kernels from ears of green corn.

One object of the present invention is to provide an automatic ear gauging and knife adjusting mechanism for corn cutters which is simple in construction, inexpensive to manufacture, and highly efficient in operation.

Another object is to provide a corn cutter wherein the cutting knives are opened by centrifugal force and gauge means are provided to limit the degree of opening of the knives according to the size of the ears of corn treated thereby.

Another object is to provide a compact cutting head for corn cutters in which the corn milk cannot become mingled with the lubricating medium around bearing surfaces of the head and in which the lubricating medium cannot leak out of the head into tainting contact with the product handled thereby.

Another object is to provide automatically adjustable knives for a corn cutter which are universally adapted for cutting blanched and unblanched corn alike.

Another object is to provide cutting knives having a surface conforming to the circumference of the cob and which remains the same irrespective of continued grinding or sharpening of the knives.

Other objects and advantages of the present invention will become apparent as the description proceeds in connection with the accompanying drawings in which.

The present invention is illustrated in connection with a corn cutter similar to the one disclosed in Patent No. 2,386,955 issued October 16, 1945 to Charles E. Kerr and, therefore, the conventional structure already known in the art will only be described sufficiently to render the present invention understandable.

Figure 1:
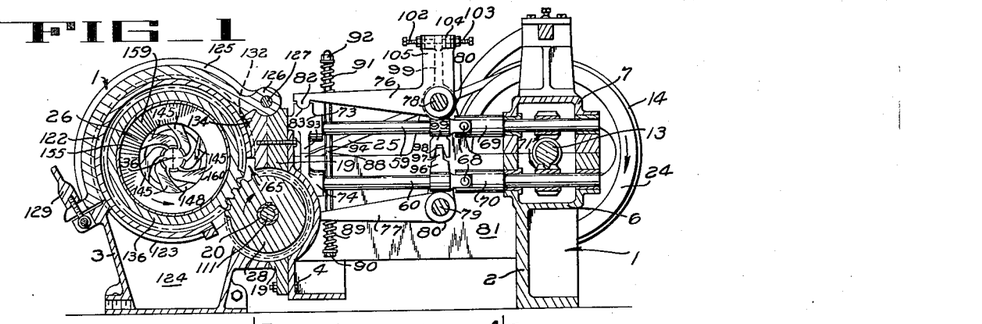
Fig. 1 is a transverse section through a corn cutter embodying the present invention.

Referring to Fig. 1 of the drawings herein, 1 designates the frame work of the corn cutter comprising a casting 2 and a housing 3 secured thereto by means of nuts and bolts 4. The frame work 1 may be mounted upon a base, not shown, at a convenient height for the operator who serves the machine.

The casting 2 includes a gear casing 6 provided with a removable cover 7 and rotatably mounted within bearings, not shown, of the gear casing 6 is a main drive shaft 13 provided with a drive pulley 14 keyed thereto for rotation therewith. The drive pulley is driven from a source of power by means of a drive belt, not shown.

Figure 2:
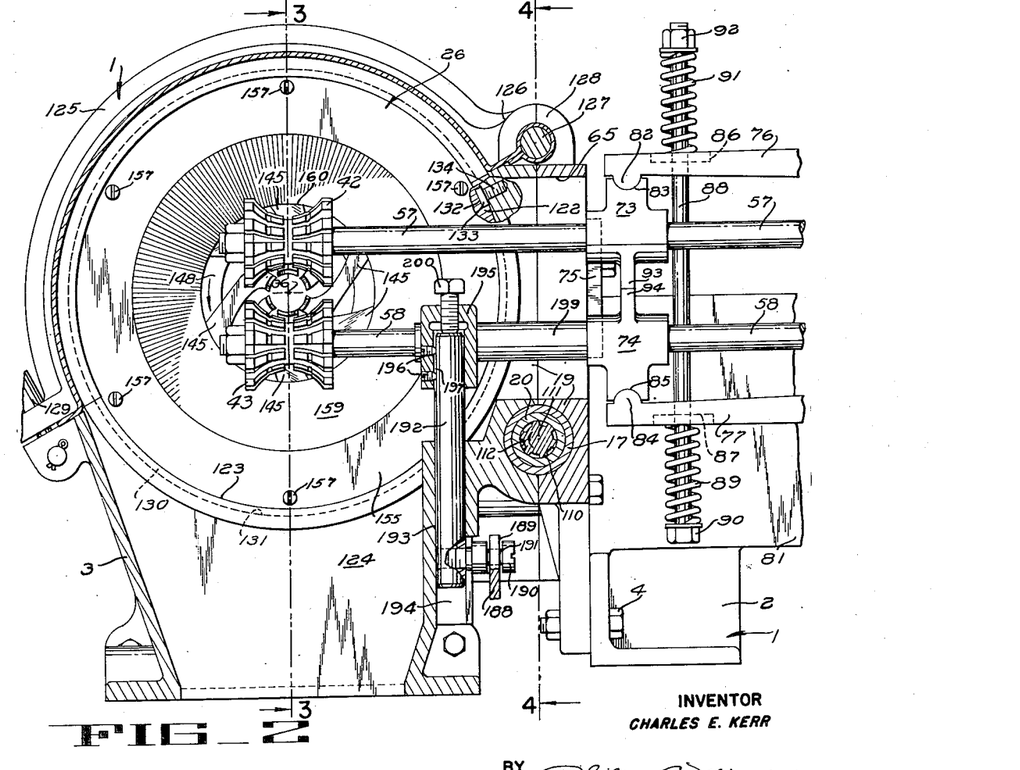
Fig. 2 is an enlarged transverse section of the corn cutter taken along line 2—2 in Fig. 4.
Figure 3:
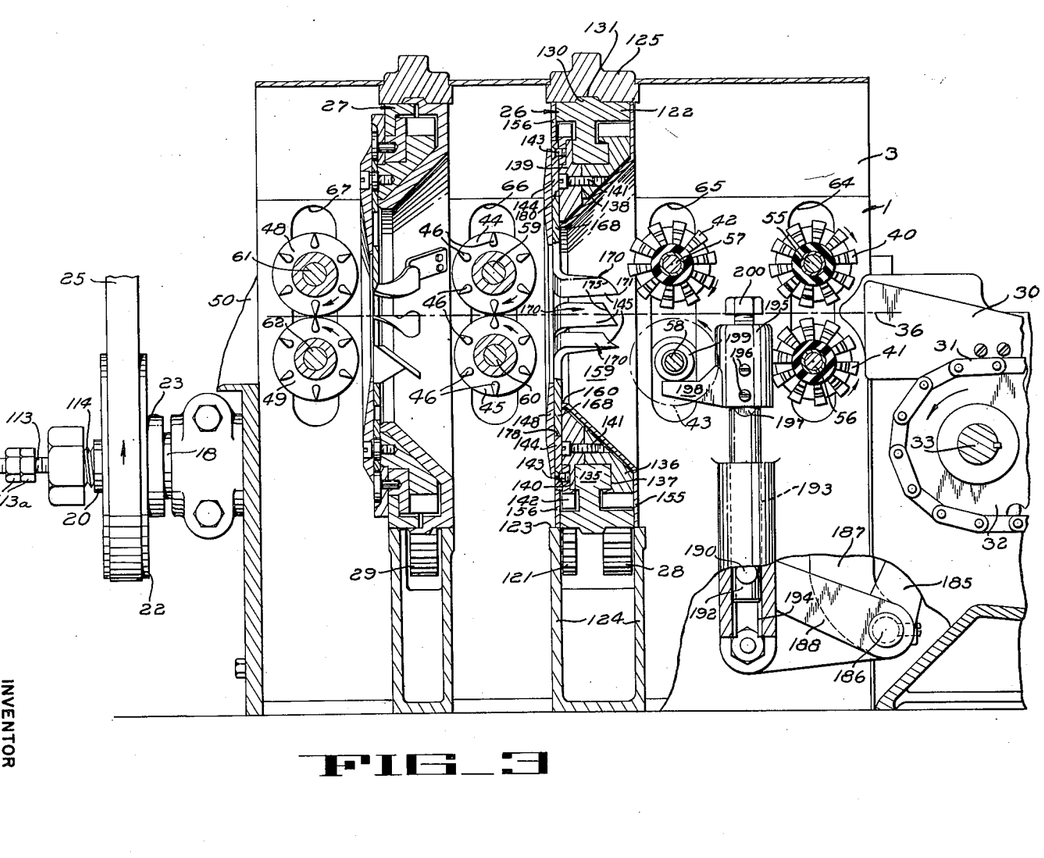
Fig. 3 is a longitudinal section of the corn cutter taken along line 3—3 in Fig. 2.
Figure 4:
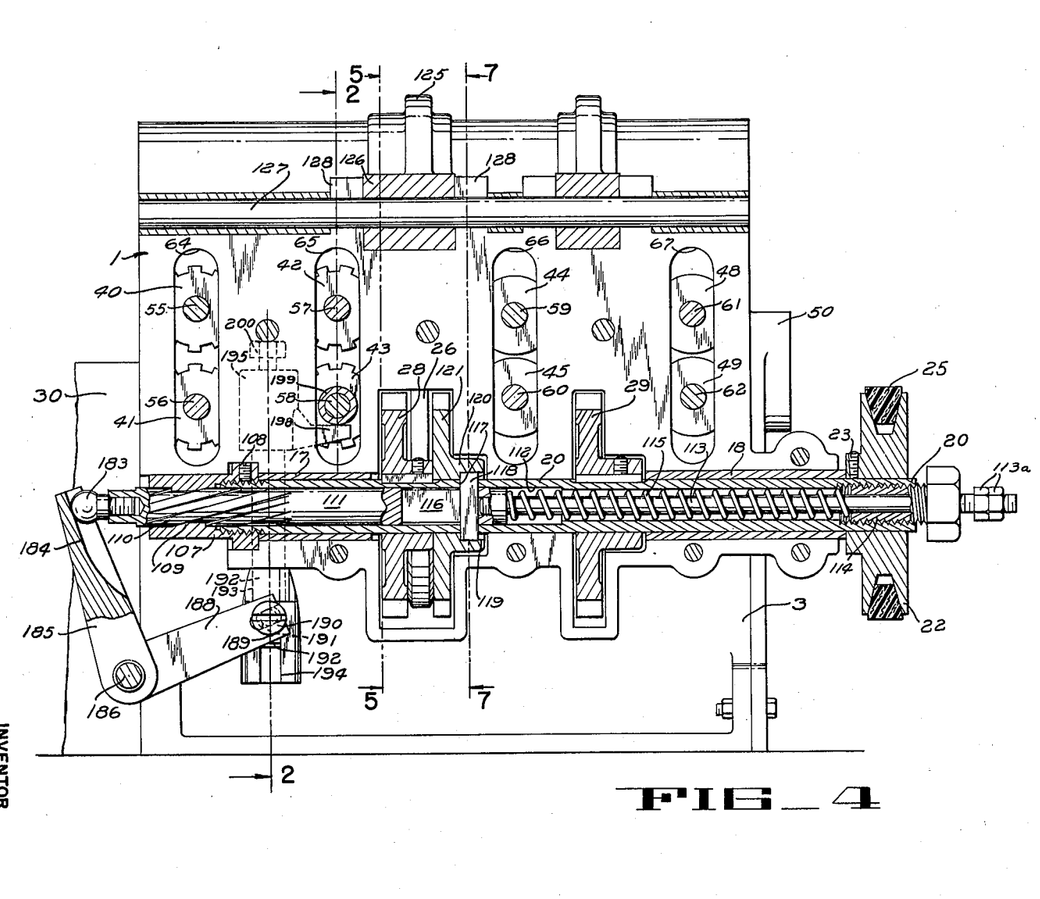
Fig. 4 is a section, partly in elevation, taken along line 4—4 of Fig. 2.
Figure 5:
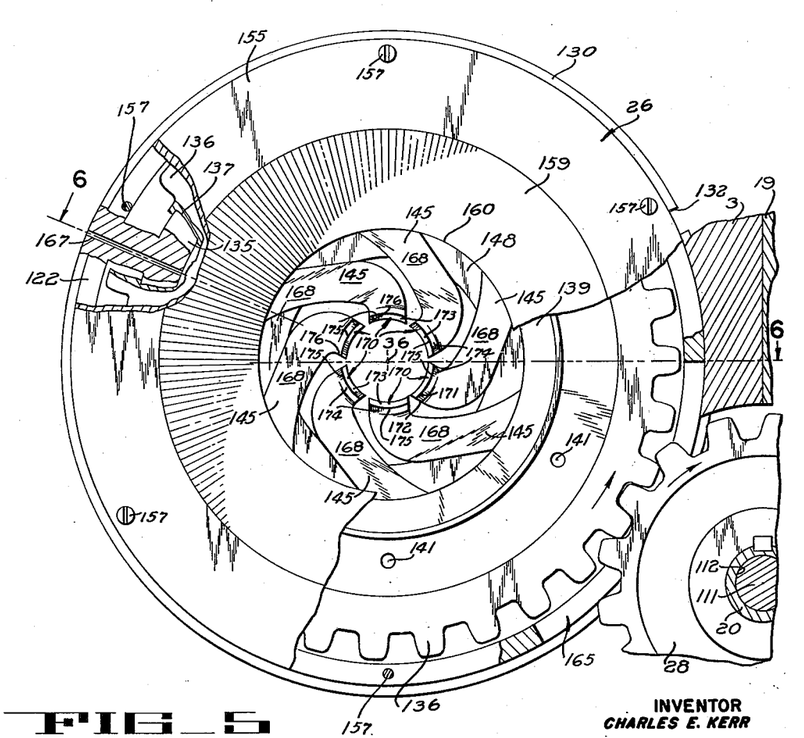
Fig. 5 is an enlarged elevation of the entrance side of the cutting head as seen substantially from line 5—5 in Fig. 4, certain parts being broken away and other parts being shown in section.

Journalled in bushings 17 and 18 (Fig. 4) secured in a split portion 19 of the housing 3 and extending parallel to the drive shaft 13 is an auxiliary drive shaft 20, Figs. 2, 3, and 4. This drive shaft, which will be described later in full detail, has a belt pulley 22 secured thereto by a set screw 23. Trained around the belt pulley 22 and a belt pulley 24 (Fig. 1) keyed to the drive shaft 13 is a V belt 25 so that upon rotation of the shaft 13, shaft 20 is correspondingly rotated. Mounted within the housing 3 is a rotary cutting head 26 and a rotary scraping head 27 (Fig. 3) each of which is driven by a gear 28 and 29, respectively, keyed to the shaft 20.

Mounted in the front portion of the housing 3 is a feed trough 30 within which an endless feed chain 31, trained around a power driven sprocket 32 and an idler sprocket, not shown, is arranged. The sprocket 32 is keyed to a shaft 33 which is driven in a conventional manner by drive mechanism (not shown), reference may be had to the aforementioned patent for further details thereof.

The husked ears of corn are deposited end to end in the feed trough 30 and are carried along the same by means of the chain 31 with their axes substantially coincident to the longitudinal axis 36 of the cutting and scraping heads 26 and 27, respectively, Fig. 3. A pair of feed rollers 40, 41 is disposed to receive an ear of corn from the chain 31 and feed it into a second pair of feed or gauge rollers 42 and 43 cooperating with the feed rollers 40, 41 to align the axis of the ear with the axis 36 of the cutting head 26 to thereby feed the ear into the cutting head.

The feed rollers 40, 41, 42, and 43 (see Figs. 2 and 3) are similar in construction, each preferably being made of soft rubber or similar resilient material in spool shaped form and provided with upstanding ribs for gripping and centering the ear of corn horizontally in alignment with the axis 36 of the cutting head 26. The feed rollers 40, 41, 42, and 43 are further provided with circumferential grooves to prevent rotation of the ears while they are fed into contact with rapidly rotating mechanism in the cutting head 26.

As each ear of corn passes through the cutting head it is fed between another pair of spool shaped rollers 44 and 45 each having metal prongs or teeth 46 which penetrate into the cob of the ear of corn and aid in withdrawing the same from the cutting head and in feeding the ear into the scraping head 27. The diameter of the rollers 44 and 45 is preferably greater than that of the preceding feed rollers to accelerate the withdrawal of the ear of corn from the cutting head to make way for the next ear fed by the rollers 40, 41, 42, and 43 toward the cutting head.

When the cob leaves the scraping head 27 it passes between discharge rollers 48, 49 which are similar to the rollers 44 and 45, but are slightly greater in diameter with respect thereto to thereby accelerate the withdrawal of the cob from the scraper head and discharge the cob into a chute 50 which in turn discharges it from the machine.

The feed rollers 40, 41, gauge rollers 42, 43, pronged rollers 44, 45, and discharge rollers 48, 49 are carried by shafts 55, 56, 57, 58, 59, 60, 61, and 62, respectively, and are fixed thereto for rotation therewith in any convenient manner (see Fig. 2). The shafts 55 to 62, inclusive, extend through elongated slots 64, 65, 66, and 67 in the split portion 19 of the housing 3, Figs. 2, 3, and 4, and are connected by universal joints 68, Fig. 1, to upper and lower shafts 69 and 70 constituting extensions of the shafts 55 to 67, respectively. The shafts 69 and 70 are rotatably mounted in the gear casing 6 and are rotated in opposite directions through worm gearing, generally designated 71, associated with the shaft 13.

Cooperating pairs of roller shafts 55 to 62 are freely movable toward and away from each other by reason of the universal joints 68 and are confined to swinging movement in a vertical plane by bearing blocks 73 and 74 guided for vertical sliding movement in channels 75 (Fig. 2) on the housing 3 adjacent the elongated slots 64 to 67.

Mounted above each of the upper shafts 55, 57, 59, and 61 is a separate equalizer arm 76 and below each lower shaft 56, 58, 60, and 62 is a separate equalizer arm 77. The upper equalizer arms 76 are pivoted on a stud shaft 78 and the lower equalizer arms 77 are pivoted on a stud shaft 79. The stud shafts 78 and 79 are fixed in bearings 80 provided in a partition 81 forming a part of the casting 2, as is shown in Fig. 1.

Each of the upper equalizer arms 76 has a trunnion 82 which fits into an arcuate groove 83 in the bearing block 73 associated therewith while each of the lower equalizer arms 77 has a trunnion 84 fitting into an arcuate groove 85 in the bearing block 74 associated therewith. Opposing upper and lower equalizer arms have apertured lugs 86 and 87, respectively, Fig. 2, through which a bolt 88 extends. A coil spring 89 is interposed between the lug 87 of each lower equalizer arm 77 and the head 90 of each bolt 88 and a similar coil spring 91 is interposed between the lug 86 of each upper equalizer arm 76 and a nut 92 on each of the bolts 88. The springs 89 and 91 urge the equalizer arms 76 and 77, the bearing blocks 73 and 74, and opposing shafts 55, 57, 59, 61, and 56, 58, 60, and 62 toward each other and hold the feed rollers, mounted on said shafts, in engagement with the ears of corn. Stops 93 and 94 on bearing blocks 73 and 74, respectively, limit the movement of opposing shafts 55 and 62 toward each other to prevent the opposing rollers from contacting each other.

To equalize the movement of the shafts of cooperating feed, gauge, and discharge rollers, each of the upper arms 76 is interconnected with its cooperating lower arm 77 for equalized movement therewith. To this end each lower arm 77 (Fig. 1) has an upstanding arm portion 96 provided with a tooth 97 which engages a jaw 98 of a lever 99 rotatably mounted on each stud shaft 78, there being a lever 99 for each equalizer arm 76. The upper end of each lever 99 is disposed between opposing adjusting screws 102 and 103 threaded into a U-shaped portion 104 of an upstanding projection 105 of each equalizer arm 76. By turning screws 102 and 103 the angular position of the arm 76 relative to the lever 99 and thus relative to the arm 77 can be adjusted.

When the machine is properly adjusted the rollers of each pair of feed, gauge, and discharge rollers are normally disposed at equal distances above and below the axis 36 of the cutting and scraping heads, as is shown in Figs. 2 and 3. When an ear of corn enters the machine the rollers are spread apart by the ear of corn against the pressure of the compression springs 89 and 91 as it passes between opposing rolls. The rollers 40, 42, 44 and 48 move upwardly, while the rollers 41, 43, 45, and 49 move downwardly, the amount of yielding movement depending upon the size of the ear, i. e., the diameter thereof. Since the cooperating equalizer arms 76 and 77 are interconnected, as hereinbefore explained, opposing feed, gauge, and discharge rollers will always be disposed at equal distances from the axis 36 so that each ear of corn during its travel through the machine is maintained with its axis coincident to the axis 36 of the cutting and scraping heads 26 and 27.

The auxiliary shaft 20 (Figs. 2 and 4) of the present invention is tubular in form and, as explained above, is mounted for rotation in the bushings 17 and 18 supported by the housing 3. One end of the shaft 20 extends beyond the bushing 18 to receive the belt pulley 22, hereinbefore mentioned. The opposite end of the shaft 20 extends beyond the bushing 17, is threaded, and has an extended tubular portion 107 threadedly connected thereto and secured in place on the shaft 20 by a set screw 108, as is shown in Fig. 4.

The extended portion 107 of the shaft 20 is provided with internal spiral slots and splines 109 which mesh with similar slots and splines 110 of a shaft 111 arranged for sliding movement in the adjacent enlarged interior 112 of the tubular shaft 20. The inner end of the shaft 111 has a rod 113 threadedly secured thereto and extending through the balance of the interior of shaft 20 and through a plug 114 which is threaded into the open end of the tubular shaft. A compression spring 115 encircles the rod 113 within the tubular shaft 20 and has its inner end bearing against the shaft 111 and its outer end against the plug 114, so that the shaft 111 will normally be urged outwardly relative to the tubular shaft 20. The amount of pressure exerted by the compression spring 115 against the shaft 111 can be varied by turning the hexagonal head of the threaded plug 114 to adjust the latter relative to the tubular shaft 20.

The threaded outer end of the rod 113 extends through the plug 114 and has a pair of lock nuts 113a thereon which constitute an adjustable stop for limiting the movement of the shaft 111, outwardly relative to the shaft 20 under the influence of the compression spring 115. The shaft 111 is provided with an elongated slot 116 extending longitudinally of the shaft 111, Fig. 4. The shaft 20 is provided with opposed circumferential slots 117, Fig. 7, communicating with the slot 116 and a key 118 extends through the slot 116, opposed circumferential slots 117, and beyond the outer surface of the shaft 20 into a keyway 119 provided in the hub portion 120 of an auxiliary gear 121. The gear 121 is similar to the cutting head driving gear 28 and is rotatably mounted on the auxiliary shaft 20 adjacent the gear 28 for rotation therewith since the key 118 establishes a driving connection between the gear 121 and the auxiliary shaft 20. Upon longitudinal movement of the shaft 111 within the shaft 20 the splining 109 on the extended portion 107 of the shaft 20 engages the splining 110 of the shaft 111 causing the shaft 111 to turn within the shaft 20. The key 118 is, therefore, turned with the shaft 111 and its ends are shifted within the slots 117 to thereby turn the gear 121 relative to the shaft 20 and gear 28. Consequently, although the gear 121 rotates in unison with the gear 28, it is adapted to be turned, i. e., advanced or retarded, upon the shaft 20 to vary its circumferential position relative to the gear 28 during their rotation with the shaft 20.

Referring now to Fig. 3 and Figs. 5 to 9, inclusive, the cutting head 26 of the present invention comprises a housing 122, positioned on a semi-circular portion 123 of a transverse partition 124 of the housing 3, Figs. 1 and 2. A semi-circular clamp 125 is hinged at 126 on a shaft 127 supported in bosses 128 formed as a part of the split portion 19 of the housing 3 and is normally held in closed position over the cutting head housing 122 by means of clamp screws 129. The cutting head is thus secured in a stationary position with its axis disposed coincident to the axis 36 along which the ears of corn travel. A rim 130 on the cutting head housing 122 is received within a groove 131 in both the support 124 and clamp 125 to maintain the cutting head in a proper position relative to the feed rollers and to prevent shifting of the cutting head when an ear of corn is thrust into the same by the feed rollers 42, 43. A portion of the rim 130 is cut out as shown at 132, Fig. 2, and fits over the square head 133 of a screw 134 threaded into the housing 3 to prevent rotation of the housing 122 when the mechanism therein is rotated.

Figure 6:
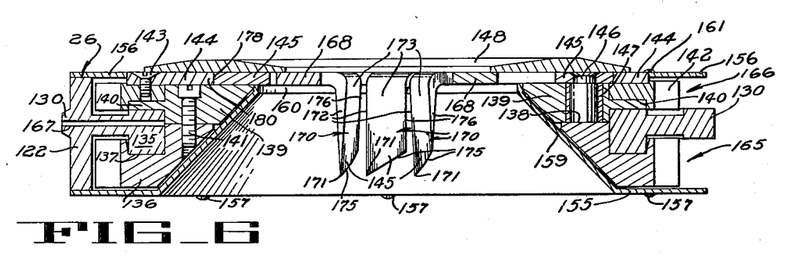
Fig. 6 is a section of Fig. 5 taken along line 6—6 thereof.
Figures 7, 8, 9:
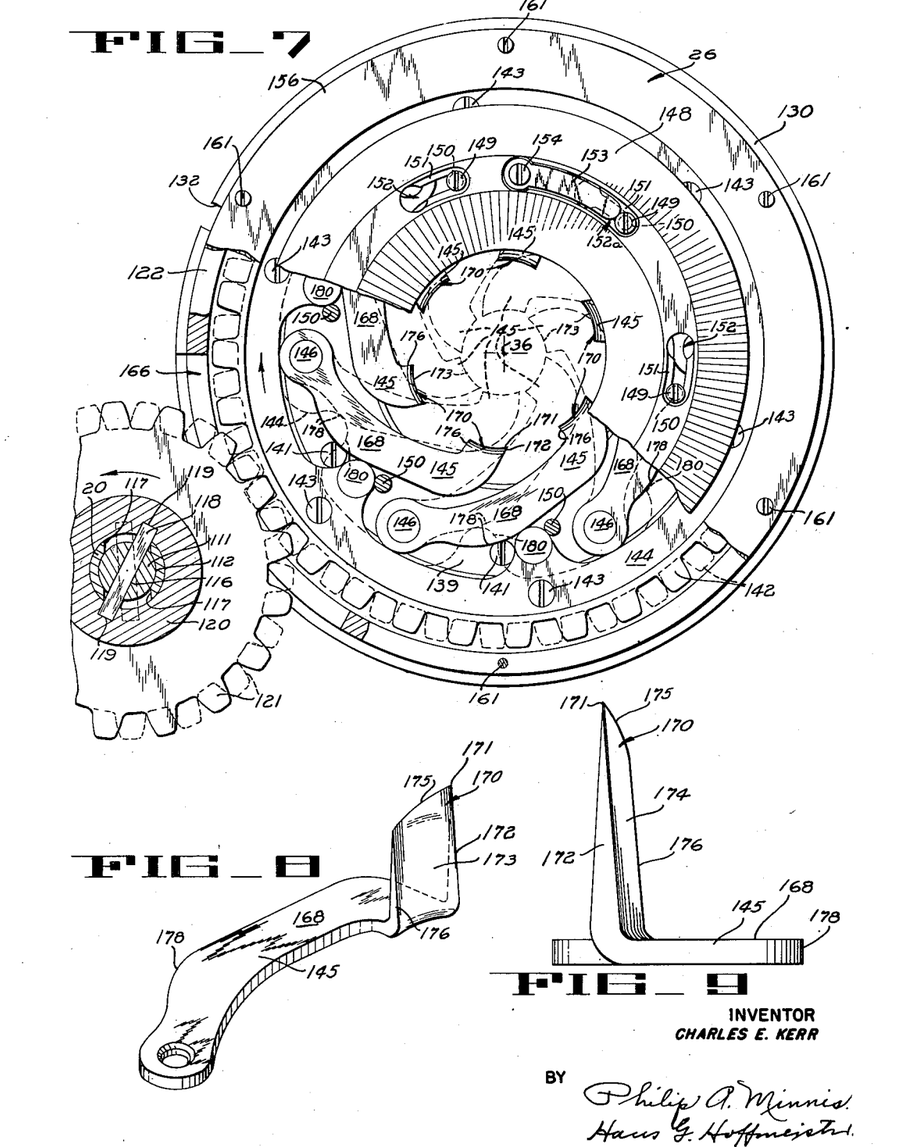
Fig. 7 is an elevation of the exit side of the cutting head as seen substantially from line 7—7 in Fig. 4, with certain parts broken away and others shown in section.
Fig. 8 is a perspective view of one of the cutting knives.
Fig. 9 is an end view of the cutting knife shown in Fig. 8.

Referring now more specifically to the structure of the cutting head 26, Figs. 3 and 5 through 7, the housing 122 thereof is provided with an annular internal flange 135 forming a guide track upon which a driven gear 136 is supported for rotatable movement. This gear 136 is provided with an annular groove 137 fitting over one side of the annular flange 135 and has an adjacent face 138 abutting against a plate 139 within the internal periphery of the annular flange 135, the plate 139 having an external flange 140 bearing against the opposite side of the annular flange 135 so that the latter is embraced by the driven gear and plate. The driven gear 136 and plate 139 are secured together by machine bolts 141, Figs. 6 and 7, are rotatable in unison relative to the stationary track provided by the flange 135 within the housing of the cutting head 26.

Rotatably supported adjacent the external flange 140 of plate 139 is a gear 142 and secured to this gear by machine screws 143 is a knife adjusting ring 144 encircling a plurality of knives 145. The knives are arranged at equally spaced positions within the adjusting ring 144 and are each provided with a laterally extending stud pin 146 disposed in a bushing 147 provided in the plate 139 as is best shown in Fig. 6.

The gear 142, adjusting ring 144, and knives 145 are retained in their respective positions relative to the plate 139 and driven gear 136 by a removable retaining ring 148 secured to the plate 139 by the heads 149 of cap screws 150, the shanks of which are threaded into the plate 139. The heads 149 of the screws 150 bear against a depressed shoulder 151 formed in arcuate slots 152 provided at equally spaced points around the retaining ring 148 so that when the ring is shifted or rotated, clockwise, Fig. 7, the heads 149 will be disposed within unflanged portions of the slots 152 to permit removal of the retaining ring. One of the arcuate slots 152a is lengthened to receive a spring clip 153 secured to the retaining ring by a cap screw 154. The opposite end of the spring clip 153 is so disposed in the slot 152a that when the retaining ring is rotated counterclockwise, Fig. 7, into locking position, the spring clip will snap down against the shoulder 151 and abut against the head 149 of the screw 150 to prevent reverse twisting of the retaining ring unless the spring clip is manually flexed outwardly for the purpose of removing the ring.

From the foregoing it is apparent that the driven gear 136, plate 139, gear 142, and adjusting ring 144, as well as the knives 145 are rotatable concentric with respect to and within the housing 122.

The cutting head 26 is completed by the provision of suitable shielding plates 155 and 156. The plate 155 is secured by cap screws 157 to the annular forward edge of the housing 122 and has a frusto-conical shaped central portion 159 terminating in an annular rim 160 abutting against the front faces of the knives 145 thereby providing an entrance to the cutting head completely covering the driven gear 136 and plate 139 and shielding the internal mechanism of the cutting head from juices dripping from the ear of corn as kernels are cut from the same by the cutting knives. The plate 156 is secured to the opposite annular edge of the housing 122 by cap screws 161, extends over the teeth of the gear 142 and abuts against the outer edge of the adjusting ring 144 to also shield the internal mechanism of the cutting head from the juices dripping from the ear of corn being treated.

The cutting head housing 122 is provided with openings 165 and 166 in its periphery at the sides of its annular rim 130. The peripheral teeth of the gears 28 and 121 extend through the openings 165 and 166, respectively, and correspondingly mesh with the teeth of the driven gears 136 and 142 so that upon rotation of the auxiliary drive shaft 20 and the gears 28 and 121, the internal mechanism of the cutting head is rotated relative to the stationary portion thereof, i. e., the annular track 135, housing 122, and the shielding plates 155 and 156 thereof.

In this manner the driven mechanism of the cutting head is rotated counterclockwise in Figs. 1, 2, 3, and 5 (clockwise Fig. 7) within the cutting head housing to draw or whirl the several knives 145 around an ear of corn as it is fed through the cutting head by the feed rollers 42 and 43.

From the foregoing it will be noted that the flanged track 135 of the housing 122 provides the only bearing surfaces between the housing and the internal mechanism of the cutting head. The bearing surfaces thus provided are lubricated in the usual manner by oil entering through a passage 167 provided in the housing 122 (Figs. 5 and 6) and terminating at the internal face of the track 135.

During whirling of the several knives, as stated above, corn milk clinging to the body portions of the knives has a tendency to work outwardly along the body of the knives under the influence of centrifugal force. While a greater portion of such corn milk is removed from the knives by the annular rim 160 of the frusto-conical portion 159 of the plate 155, some corn milk will continue to work outwardly along the knives due to centrifugal force and, therefore, will enter between the knives and plate 139 as well as between the plates 139 and 155. Such corn milk, especially the milk or juices from cream style corn are very starchy and have a tendency to become tacky and to gradually interfere with the movement of the internal mechanism of the cutting head.

Since the track 135 is of lesser diameter than the outer periphery of the driven gear 136 and gear 142, and the plate 139 and driven gear 136 completely embrace the track 135, the track is shielded from the outwardly trending starchy juices. The plate 139 and driven gear 136 are secured together by the bolts 141 such that the corn milk cannot pass between them along the face 138 of the gear 136. Consequently, the corn milk working outwardly along the knives and between the plates 139 and 155 must continue outwardly between the driven gear 136 and plate 155 or between the gear 142 and the external flange 140 of the plate 139. Since the gears 136 and 142 are rapidly rotating, the corn milk reaching the peripheries thereof will be forced outwardly due to centrifugal force and, therefore, will not flow inwardly toward the annular track 135. The corn milk is thrown from the periphery of each gear 136 and 142 against the internal face of the housing 122 and eventually is discharged therefrom by way of the openings 165 and 166 in its periphery.

From the foregoing it will be apparent that the internal mechanism of the cutting head can be kept well lubricated because lubricating medium entering between the bearing surfaces of the track 135 and the plate and gear 139, 136 also has a tendency to work its way outwardly due to centrifugal force and will be discharged from the housing 122 with the corn milk discharging from the same through the openings 165 and 166. It is, therefore, apparent that the lubricating medium cannot escape from the interior of the housing along the cutting knives 145 and beyond the annular rim 160 of the shield 155. Therefore, the lubricating medium cannot come in contact with the corn kernels and juices discharging from the cutting knives into the frusto-conical portion 159 of the cutting head. Consequently, contamination of the kernels and corn milk discharging from the knives is prevented and a pure unadulterated finished product is assured.

The knives 145 are substantially C shaped as is shown in Figs. 7 and 8 and their main body portions 168 are hung from the stud pins 146 in such a manner as to normally swing outwardly due to centrifugal force as the knives whirl within the cutting head. The free end of the main body portion 168 of each knife is bent approximately 85 degrees laterally providing forwardly extending blade portions 170 disposed in a plane substantially radially relative to the axis of the stud pin 146 about which the respective knife swings. The extreme end of each blade portion 170 is disposed foremost within the frusto-conical entrance 159 of the cutting head and is cut off at an angle of approximately 25 degrees to provide an apex 171 adjacent the trailing edge 172 of the blade.

Each blade 170 is provided with an inner face 173 which is initially hollow ground or of concave shape to conform substantially to the periphery of an ear of corn, the configuration of the several blades 170 being such as to provide a substantially circular orifice, see Fig. 7, concentric to the axis 36 irrespective of whether the knives are in open or closed position. The inner face 173 is also initially ground from the heel of the blade toward the free end thereof at an angle of 2 degrees so that the free end of the blade will be disposed a greater distance from the axis 36 of the cutting head than is the heel of the blade. The outer face 174 of each blade 170, i. e., opposite the face 173 thereof, is convex and tapers toward the extreme end of the blade. Each blade is sharpened by grinding the face 174 so as to provide a cutting edge 175 at the extreme end of the blade which cutting edge gradually rises from the leading edge 176 of the blade toward the apex 171 adjacent the trailing edge 172 of the blade.

The back edge of the C-shaped body portion 168 of each knife (Fig. 7) is provided with a camming surface 178 which engages an adjacent camming projection 180 on the inner periphery of the knife adjusting ring 144, there being one such projection for each knife to limit the outward movement of each of the knives under the action of centrifugal force as they whirl within the cutting head. Each camming projection 180 is preferably a hardened steel disk inserted in the adjusting ring and secured thereto by welding or the like, in such a position that the camming surface 178 of each knife is engaged at precisely the same point to hold the several knives in concentric relation with respect to the axis 36 of the cutting head.

Since the knife adjusting ring 144 and gear 142 are rotatable with respect to the driven gear 136 and plate 139, a slight turning of the gear 142 and ring 144, clockwise (Fig. 7) relative to the driven gear 136, causes the several camming projections 180 to shift with respect to the knives 145 and to bear against the camming surfaces 178 thereof to cam or swing the knives simultaneously inwardly, counterclockwise (Fig. 7) in opposition to the effect of centrifugal force thereon. In this manner the knives 145 are caused to move in unison, iris fashion, into their closed position, as shown in dotted lines in Fig. 7, and in full lines in Figs. 1, 2, 3, 5, and 6.

The knives 145 are normally disposed in closed position by the action of the compression spring 115 in the auxiliary drive shaft 20. In other words, the spring 115 urges the shaft 111 outwardly relative to the tubular shaft 20, Fig. 4, causing the shaft 111 to turn as its splining 110 shifts in the splining 109 of the extended portion 107 of the shaft 20. As the shaft 111 is thus turned, the key 118 and gear 121 are turned in one direction and the gear 142 and knife adjusting ring 144 are correspondingly turned in an opposite direction. The knife adjusting ring 144 is thus turned relative to the driven gear 136 and plate 139 to shift the camming projections 108 into their normal or dotted line position, Fig. 7, to thereby maintain the knives 145 in their extreme closed position.

The exposed end of the splined shaft 111 has a case hardened ball ended stud 183 threadedly connected thereto (Fig. 4) and the ball end of of this stud is disposed in a concave or groove 184 formed in a lever arm 185. The lever arm 185 is pivotally mounted on a stud pin 186 secured to a bracket 187 forming part of and depending from the housing 3 as is shown in Fig. 3. A second lever arm 188 (Figs. 3 and 4) formed integrally with or welded to the arm 185, is movable therewith on the stud pin 186 and has a bifurcated free end 189 embracing a stud pin 190 within an annular recess 191 provided in the stud 190. The shank of the stud 190 is threadedly connected to the lower end of a push rod 192 and is peened securely to the same as is shown in Figs. 2 and 3.

The push rod 192 is arranged for vertical sliding movement in a sleeve 193 formed on the lower portion of the housing 3 and located substantially between and below the first and second pairs of feed rollers 40 to 43 inclusive. The lower portion of the sleeve 193 is cut away exteriorly of the housing 3 to provide a vertical slot 194 through which the stud 190 extends so as to prevent turning of the push rod 192 relative to the sleeve 193.

The upper end of the push rod 192 normally extends above the sleeve 193 to the level of the lower feed roller shafts 56 and 58 and has a cap or head 195 mounted thereon and secured thereto by headless set screws 196. The set screws 196 bear against a flattened surface 197 provided on the push rod 192 to prevent turning of the head 195 relative to the push rod. The head 195 has an integral nose portion 198 which extends beneath the roller shaft 58, adjacent the cutting head 26, and normally engages a bearing sleeve 199 mounted upon the shaft 58. Threaded into the top of the head 195 is a bolt 200 adapted to bear against the top surface of the push rod for adjusting the position of the head relative to the push rod when the set screws 196 are loosened. The position of the nose portion 198 relative to the roller shaft and sleeve 199 can thus be adjusted when the feed rollers are in their normal or closed position.

Assuming the machine to be in operation, the auxiliary drive shaft 20 is driven by pulleys 22, 24, and belt 25 causing rotation of the drive gears 28, 29, and the gear 121 thereby rotating the driven mechanism of both the cutting and scraping head at a comparatively high speed, for instance, 1200 R. P. M.

The scraping head is constructed and operates in the manner described in United States Letters Patent No. 2,323,092 dated June 29, 1943 and since it is not pertinent to the present invention, reference to such patent may be had for a more complete understanding of the scraping head.

The roller shafts 55 through 62 are driven from the common drive shaft 13 simultaneously with the operation of the auxiliary drive shaft 20 to rotate the feed rollers 40, 41, 42, and 43, pronged rollers 4, 45, and discharge rollers 48 and 49 while the ears of corn are continuously fed toward the rapidly rotating cutting head by the feed chain 31. Each ear of corn passes between cooperating rollers 40, 41, and 42, 43 and is fed thereby into the cutting head 26 along the axis 36 thereof. As an ear of corn enters between the feed rollers 42 and 43, it spreads them apart causing their respective shafts 57 and 58 to swing away from each other against the action of the coil springs 89, 91 associated therewith. The roller shaft 58 is thereby moved downwardly causing the bearing sleeve 199 thereon to press downwardly upon the nose portion 198 of the head 195 to thereby move the push rod 192 downwardly in the sleeve 193. When the push rod is thus moved downwardly, the stud pin 190 at the lower end thereof bears down upon the bifurcated lever arm 188 swinging the latter and the lever arm 185 about the stud pin 186, counterclockwise in Fig. 3 (clockwise in Fig. 4) causing the grooved upper end 184 of the arm 185 to push against the ball ended stud 183.

The stud 183 and splined shaft 111 are rotating at high speed with the auxiliary shaft 20 and relative to the lever arm 185 as the latter presses the splined shaft into the tubular shaft 20 against the action of the compression spring 115. Since the splined extension 107 of the shaft 20 is secured thereto and rotating therewith, movement of the splined shaft 111 within the tubular shaft 20 causes a relative turning of the splined shaft 111 in a direction opposite to its direction of rotation (Fig. 7) thereby turning the key 118 and gear 121 from dotted toward full line position (Fig. 7). In other words, turning of the splined shaft causes a retarding action in the rotation of the gear 121 to shift the latter circumferentially backwards relative to the gear 28 during its rotation with the same. Turning of the gear 121 from dotted toward full line position (Fig. 7) causes turning of the gear 142 and knife adjusting ring 144 in a counterclockwise direction in Fig. 7, relative to the driven gear 136 within the cutting head 26. The several camming projections 180 on the knife adjusting ring 144 are thereby shifted circumferentially away from the back edges 178 of the knives 145 allowing the knives to swing outwardly, i. e., to open up in iris fashion under the centrifugal forces acting upon the same.

The outward movement of the knives 145 as aforesaid is limited due to the engagement of the edges 178 thereof with the camming projections 180 of the knife adjusting ring. Consequently, the position of the blades 170 relative to the ear of corn is determined by the relative positions of the feed rollers 42, 43 with respect to the ear of corn engaged by the latter.

The relationship between the gauging rollers 42, 43 and the blades 170 of the knives can best be visualized in Fig. 2. It will be noted in Fig. 2 that as the peripheries of the rollers 42, 43 bear against the outer periphery of an ear of corn, the cutting edges 175 of the several blades are set to cut the kernels from the ear slightly above the cob line of the ear as the rollers feed it through the cutting head. This relationship between the peripheries of the gauge rollers and the cutting edges 175 of the blades may be varied by the tightening or releasing the bolt 200 relative to the head 195 so as to change the position of its nose portion 198 relative to the sleeve 199. In this manner the relationship between the cutting edges 175 and the peripheries of the gauge rollers can be changed to different depths of cut to suit the particular kernel being cut or for cutting either whole kernels or portions thereof, as in the case of cream style corn. However, once this relationship is determined it remains the same irrespective of spreading of the gauge rollers by an ear of corn. In other words, the spreading of the rollers 42 and 43 as hereinbefore explained causes a corresponding opening of the several blades 170 at an approximate 1 to 1 ratio, in iris fashion, their cutting edges remaining in direct relation to the distance between the spool shaped gauge rollers 42, 43. Therefore, the diameter of the orifice provided by the several blades 170 is in direct relation to the diameter of the ear of corn as detected by the gauge rollers so as to slice the kernels from the cob at approximately the same depth irrespective of deviations in the diameter of the ear of corn.

It will be noted that the configuration of the concave surfaces 173 and the angular disposition of the several blades 170 relative to the long axis of an ear of corn is such that irrespective of the position of the several blades between open and closed position, the cutting edges 175 of the blades will at all times be disposed in the desired cutting plane, for instance, a radial distance from the axis 36 which is slightly outside the cob line of the ear of corn.

Consequently, as the knives 145 open in the manner as above described, their cutting edges 175 are accurately set in direct cutting relation with respect to the ear of corn and as the ear enters between the whirling cutting knives and passes therebetween, the kernels are cut from the ear without scraping or digging into the cob. The kernels thus cut from the cob are discharged from the knives and deflected by the frusto-conical portion 159 of the plate 155 into a collecting chute or the like, not shown.

Due to the angular disposition of the inner faces 173 of the blades 170 of the knives 145, it is apparent that special or precision grinding is unnecessary because even though the tapered surface 174 of a blade is ground during subsequent sharpening of the blade, the cutting edge 175 thereof will always be in the arcuate plane of the inner face 173 of the blade. By reason of the cutting edge 175 being disposed to cut the kernels from an oncoming ear of corn at a predetermined cutting plane, for instance, slightly outside the cob line thereof, the knife structure of the present invention readily adapts itself to the knife adjusting movement of the cutting head and to any variations in the tapered end of an ear of corn. Moreover, the cutting edge 175 being obliquely disposed relative to the oncoming ear of corn and being spaced properly from the cob line of the same, clean and accurate cutting of the kernels from the ear without scraping fibers from the cob is assured irrespective of whether the corn is blanched or unblanched.

The leading portion of the ear of corn after passing the blades 170 enters between the pronged rollers 44, 45 which are slightly greater in diameter than the feed rollers 42, 43 and, therefore, accelerate the withdrawal of the ear of corn from the cutting head. The trailing end of the ear of corn is engaged by the gauging rollers 42, 43 until only a few annular rows of kernels remain to be cut from its tapered end. As the ear of corn passes from between the gauging rollers, they are released for movement toward each other by their respective coil springs 89, 91. The roller shaft 58 and sleeve 199 thereon is therefore moved away from the nose portion 198 associated with the push rod 192 freeing the latter for upward movement. Consequently the lever arms 188 and 185 are freed and the splined shaft 111 thereby released for return movement toward its normal position by action of the compression spring 115. The splined shaft is accordingly turned relative to the shaft 20 and the gear 121 advanced relative to the gear 28 (counterclockwise Fig. 7). The adjusting ring 144 is, therefore, advanced relative to the driven gear 138 and plate 139 causing the protuberances 180 to urge the knives 145 inwardly against the action of centrifugal forces acting upon the same. However, it will be noted that the heel or base of each knife, where the body portion 168 meets the blade 170 thereof, will ride upon the cob of the ear being withdrawn from the cutting head and the blades will thereby be prevented from returning into full closed position.

Since the inner concave face 173 of each blade is initially ground away and disposed substantially at an angle of 2 degrees with respect to the axis 36 of the cutting head, the heel is maintained in contact with the periphery of the cob while the cutting edge 175 is disposed slightly above the cob line to slice the kernels remaining on the tapered end of the ear at the desired cutting plane.

By the time the ear of corn passes from between the several blade portions 170 and before the latter are permitted to return to their normal or closed position, the next succeeding ear will have entered between the gauging rollers 42, 43 spreading them in the manner as hereinbefore explained to again set the blades of the cutting knives in the proper position to slice the kernels from such ear of corn as it is thrust into the cutting head along the axis 36.

From the foregoing description it will be observed that in the construction of the present invention, only a few parts are required in the cutting head and especially that no springs are used within the cutting head making it easier to maintain the internal mechanism of the cutting head in proper working order. Another important advantage of the present invention resides in the fact that once the internal mechanism of the cutting head is adjusted during manufacture, no further major adjustments are required after it has been installed. Moreover, the feature of initially grinding the cutting edges of the several knives to the proper angle and curvature relative to an ear of corn eliminates precision grinding and honing during subsequent sharpening of the blades as is required in prior types of corn cutter blades.

Having thus described the present invention, I desire it to be understood that it is not limited to the precise details of construction illustrated, but that various applications, modifications, and variations may be resorted to without departing from the spirit or scope of the invention. I, therefore, deem myself entitled to such applications, modifications, and variations as come within the scope of the claims appended hereto.

What I claim as new and desire to protect by Letters Patent is:

1. In a green corn cutter comprising a rotary knife carrier, a plurality of knives mounted on said carrier for radial movement relative to its central axis under the influence of centrifugal force, knife adjusting means for engaging the knives to limit outward movement thereof, means for driving said carrier, an auxiliary gear carried by said driving means and engaging said knife adjusting means for rotating said knife adjusting means, gauging means mounted in advance of said carrier for engaging an ear of corn delivered endwise toward said knives, and means operatively connecting said gauging means with said driving means for advancing or retarding said auxiliary gear to correspondingly shift said knife adjusting means relative to the carrier to thereby effect inward and permit outward movement of said knives commensurate with the movement of said gauging means as determined by the diameter of said ear of corn for cutting the kernels from the ear at a predetermined depth relative to the periphery of the same.

2. A green corn cutter comprising a cutting head including a knife driving gear carrying a plurality of knives adapted to move outwardly under the influence of centrifugal force, a knife adjusting ring encompassing said knives and engageable with the same for limiting outward movement thereof, an internally splined drive shaft, a drive gear keyed to said drive shaft in engagement with said knife driving gear for rapidly rotating the same, a splined shaft slidably mounted in the drive shaft and adapted to turn when shifted therein, a knife adjusting gear drivingly engaging said knife adjusting ring and slidably keyed to said splined shaft for turning movement therewith relative to the drive shaft, means for normally urging said splined shaft in one direction for turning the knife adjusting gear and ring into a position for holding said knives in their extreme closed position, means for gauging the diameter of an ear of corn as it is fed into said cutting head and for shifting the splined shaft correspondingly away from its normal position within said drive shaft to thereby turn said adjusting ring to position said knives for cutting the kernels from the ear at a predetermined depth irrespective of the diameter of the ear of corn.

3. A green corn cutter comprising a cutter head including a stationary annular housing provided with an internal track, a driven gear mounted for rotation on said internal track and having a central opening for passing an ear of corn endwise therethrough; a plurality of knives mounted on said driven gear for radial movement in iris fashion within the central opening of said driven gear and adapted to move outward under the influence of centrifugal force, a driving shaft having rotary gear drive means thereon operatively engaging said driven gear for effecting outward movement of said knives under the influence of centrifugal force, a knife adjusting gear mounted concentrically on and rotatably adjustable relatively to said driven gear and operatively engaging said knives for limiting outward movement thereof, a second gear mounted on said drive shaft and having driving connection with said knife adjusting gear, means normally moving said second gear on said drive shaft to rotate said knife adjusting gear relatively to said rotating driven gear to maintain said knives in their extreme closed position, means for gauging the diameter of an ear of corn passing through said central opening, and means operatively interconnecting said ear gauging means and said second gear carried by said drive shaft for rotating said second gear relatively to said drive shaft and thereby rotating said knife adjusting gear relative to said driven gear thereby to permit centrifugal opening of said knives in predetermined relation to the diameter of the ear of corn passing through said central opening for cutting the kernels from the ear.

4. A green corn cutter comprising a rotary knife carrier, a knife mounted thereon for radial movement under the influence of entrifugal force upon rotation of the carrier, a power driven drive shaft, first gear means interconnecting the drive shaft and carrier for driving the carrier, knife adjusting means mounted to rotate adjacent said carrier and co-axially thereof, a portion of said adjusting means being mounted to retain the knife against radial movement by centrifugal force, second gear means interconnecting the drive shaft to the knife adjusting means for driving the knife adjusting means, means to shift said second gear means relative to the first gear means to move said knife adjusting means relatively to the knife, means biasing said second gear means relatively to the first gear means to normally urge the knife adjusting means to a position preventing radial movement of the knife under the influence of centrifugal force, gauging means mounted to be actuated by an ear of corn fed endwise toward the knife to gauge the diameter of the ear, and means interconnecting the gauging means with the second gear means to shift the second gear means relatively to the first gear means and thereby to turn the knife adjusting means to free the knife for limited outward movement under the influence of centrifugal force proportionately to the amount of actuation of the gauging means.

CHARLES E. KERR.

REFERENCES CITED

The following references are of record in the file of this patent:

UNITED STATES PATENTS

| Number | Name | Date |
|---|---|---|
| 1,975,574 | Hansen | Oct. 2, 1934 |
| 2,212,071 | Morral et al. | Aug. 20, 1940 |
| 2,214,285 | Schmidt | Sept. 10, 1940 |
| 2,386,955 | Kerr | Oct. 16, 1945 |